US008067848B1

(12) United States Patent
Vilsaint

(10) Patent No.: US 8,067,848 B1
(45) Date of Patent: Nov. 29, 2011

(54) BICYCLE ADAPTER MOBILE TELEPHONE CHARGER

(76) Inventor: Lixon Vilsaint, Pompano Beach, FL (US)

( * ) Notice: Subject to any disclaimer, the term of this patent is extended or adjusted under 35 U.S.C. 154(b) by 306 days.

(21) Appl. No.: 12/321,061

(22) Filed: Jan. 14, 2009

Related U.S. Application Data

(60) Provisional application No. 61/010,908, filed on Jan. 14, 2008.

(51) Int. Cl.
 *B60L 11/02* (2006.01)
(52) U.S. Cl. ............................ 290/45; 290/1 R; 320/104
(58) Field of Classification Search .................... None
 See application file for complete search history.

(56) References Cited

U.S. PATENT DOCUMENTS

| 3,921,741 | A | | 11/1975 | Garfinkle et al. | |
|---|---|---|---|---|---|
| 4,204,191 | A | * | 5/1980 | Daniels | 340/432 |
| 4,839,548 | A | * | 6/1989 | Bech | 310/67 A |
| 5,789,898 | A | * | 8/1998 | Suzuki et al. | 320/104 |
| 5,833,534 | A | * | 11/1998 | Lai | 362/473 |
| 5,842,714 | A | | 12/1998 | Spector | |
| 6,016,022 | A | | 1/2000 | Cho | |
| 6,104,096 | A | | 8/2000 | Hicks | |
| 6,765,362 | B2 | * | 7/2004 | Ta-Shuo | 320/104 |
| 6,783,040 | B2 | * | 8/2004 | Batchelor | 224/413 |
| 6,987,327 | B1 | | 1/2006 | Lucatero | |
| 7,042,123 | B2 | | 5/2006 | Kitamura et al. | |
| 7,044,891 | B1 | | 5/2006 | Rivera | |
| 7,059,989 | B2 | | 6/2006 | Fukui | |

* cited by examiner

*Primary Examiner* — Michael Zarroli

(57) ABSTRACT

A bicycle-based mobile telephone charging apparatus is herein disclosed comprising a frame-mounted electrical generator utilizing contact with a tire portion in a conventional manner to produce power to be supplied to a voltage regulator and charging circuit located in a frame-mounted pouch near a front of the bicycle. Interconnecting cabling is routed along the bicycle frame between the generator and the pouch. It is envisioned that a specialized cable commonly provided with a cellular phone or other electronic devices, connects the apparatus to a charging jack portion of the mobile telephone. The mobile phone is then placed in the pouch allowing the batteries to be charged while the user rides the bicycle.

15 Claims, 4 Drawing Sheets

BICYCLE ADAPTER MOBILE TELEPHONE CHARGER

RELATED APPLICATIONS

The present invention was first described in U.S. Provisional Patent Application No. 61/010,908 filed on Jan. 14, 2008, the entire disclosures of which are incorporated herein by reference.

FIELD OF THE INVENTION

The present invention relates generally to an electrical generator for mounting thereon a bicycle in order to generate an electrical current from normal operation of the bicycle to power or charge a mobile electronic device.

BACKGROUND OF THE INVENTION

Throughout the world, mobile telephone usage has skyrocketed. Many mobile phone devices utilize a rechargeable battery for power. To recharge the battery, wall-mounted alternating current (AC) chargers and motor vehicle cigarette lighter chargers are used. These chargers are significantly limited in use due to locations, such as remote areas or third world countries where an electrical power source for recharging the batteries is not available. Another such instance may be users who take long, multi-hour bicycle rides and need the convenience and safety of a mobile telephone. Accordingly, there exists a need for a means by which mobile telephones can be easily recharged in a manner which addresses the above described shortcomings. The development of the system herein described fulfills this need.

The system discloses a bicycle-based mobile telephone charging apparatus and system of use. A frame-mounted, pedal-powered generator is provided on a rear wheel of the bicycle which provides power to a voltage regulator and charging circuit located in a frame-mounted pouch near a front portion of the bicycle. Interconnecting cabling, routed through a conduit, connect the rear wheel-mounted generator to the pouch. A specialized cable connects to a charging jack of the mobile telephone while the telephone is placed in the pouch. In such a manner, the user can charge the batteries while riding a bike.

This recharging system can be especially advantageous in remote areas where electrical power is not readily available.

Several attempts have been made in the past to provide electrical power to electronic components and devices particularly using power generated by a bicycle. U.S. Pat. No. 5,842,714, issued in the name of Spector, describes a bicycle power pack comprising a direct current (DC) power pack which is incorporated within the frame of a bicycle and supplies operating power to the bicycle illumination system. However, unlike the present system, the Spector bicycle power pack requires a set of internal rechargeable batteries located within a hollow tube member of the bicycle frame and does not generate electrical power through motion of said bicycle.

U.S. Pat. No. 6,104,096, issued in the name of Hicks, discloses electricity generation for pedaled vehicles comprising an electricity generating unit mounted within a pedal of a bicycle or the like in order to provide power to a plurality of LED's mounted on said pedal or bicycle frame. However, unlike the present system, the Hicks electricity generation unit utilizes a gear box internal to the pedal to drive the rotor of a generator to produce a small amount of electricity which can illuminate the array of LED's.

U.S. Pat. No. 6,016,022, issued in the name of Cho, discloses an electricity generating system of a bicycle comprising a dynamo, a drive wheel, and a belt system concentrically located to a bicycle wheel. However, unlike the present system, the Cho electricity generating system is in constant contact with the bicycle wheels and does not provide a means of transferring the electricity generated to an electronic device.

While these devices fulfill their respective, particular objectives and appear to disclose various attempts to generate electricity from a bicycle for use with electronic components; none of the prior art particularly discloses a generating and charging adapter for mobile electronic devices comprising a generator mounted adjacent to a rear wheel of a bicycle which generates electricity which is transferred to a charging adapter assembly for connecting to mobile electronic devices. Accordingly, there exists a need for such a system that operates without the disadvantages as described above.

SUMMARY OF THE INVENTION

In view of the foregoing disadvantages inherent in the prior art, it has been observed that there is need for a bicycle-mounted generating and charging adapter for mobile electronic devices.

To achieve the above objectives, it is an objective of the present system to provide an apparatus which generates electricity for powering and charging a mobile electronic device comprising a generator, a mounting bracket, a holding pouch, an electrical connection, a regulating circuit, and associated wiring.

A further object of the present invention is to provide a generator comprising a rotor friction wheel which is in contact with a side wall of a rear tire of the bicycle and provides rotational motion to the electricity generating dynamo of said generator. The electrical power generated by the generator is transferred to the regulating circuit via generator output wiring.

Yet another object of the present invention is to provide a mounting bracket comprising a torsion spring and a release lever which secures the generator to the bicycle frame adjacent to the rear tire. The spring provides a means of positioning the rotor friction wheel in contact with the bicycle tire such that the rotation of the tire is transferred to said rotor friction wheel.

Yet still another object of the present invention is to provide a release lever which provides a means of engaging and disengaging the rotor friction wheel to the bicycle tire. Once disengaged the generator is positioned away from the bicycle tire and is separated from the same by a physical gap thus generating no electricity and providing no motion retarding force to the rotation of said tire.

Yet still another object of the present invention is to provide a regulating circuit which provides a means of rectifying and regulating variable electrical current as generated by the generator and delivered to the electrical connection.

Yet another object of the present invention is to provide a holding pouch which provides a storage means for the regulating circuit, the electrical connection, and associate connecting cable and a means of securing the same to a front portion of the bicycle frame as well as a storage means for the mobile electrical device while connected to the apparatus and being charged.

Yet another object of the present invention is to provide a female electrical connection which provides a means of receiving a corresponding male electrical charger connection thereby supplying a rectified electrical current to the mobile electronic device.

Yet another object of the present invention is to provide a method for utilizing a bicycle generating and charging adapter for mobile electronic devices.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
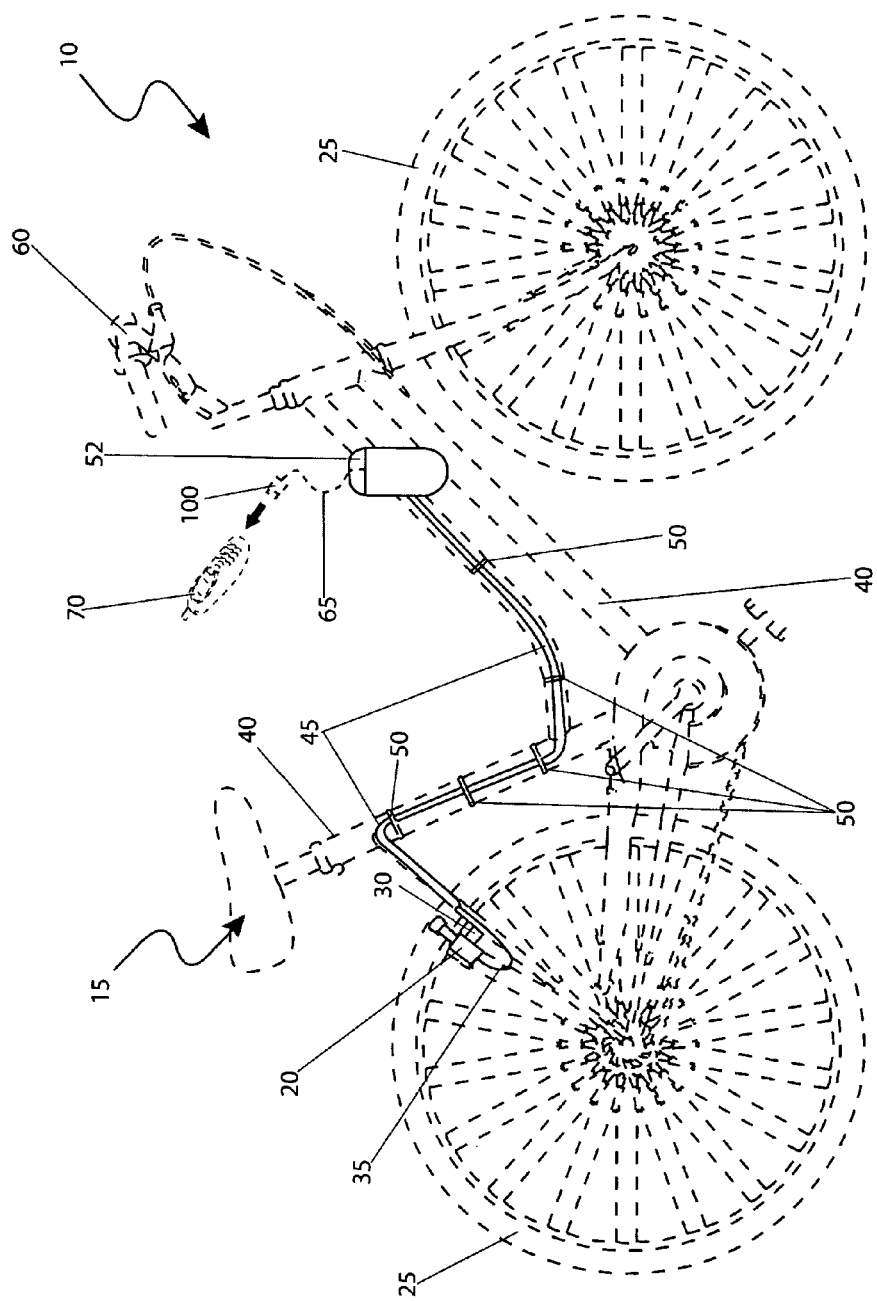
FIG. 1 is a side view of a bicycle generating and charging adapter for mobile electronic devices 10 depicted here installed upon a bicycle 15, according to the preferred embodiment of the present invention.

| | |
|---|---|
| 10 | bicycle generating and charging adapter for mobile electronic devices |
| 15 | bicycle |
| 20 | generator |
| 22 | rotor friction wheel |
| 25 | tire |
| 27 | fastener |
| 30 | mounting bracket |
| 32 | spring |
| 33 | release lever |
| 35 | wiring |
| 40 | bicycle frame |
| 45 | protective sheath |
| 50 | tie-wrap fastener |
| 52 | holding pouch |
| 53 | first fastener |
| 54 | second fastener |
| 55 | first pouch strap |
| 56 | second pouch strap |
| 57 | flap |
| 58 | flap fastener |
| 59 | pouch orifice |
| 60 | handlebars |
| 65 | charging connection cable |
| 70 | mobile electronic device |
| 75 | grommet |
| 80 | rectifying and regulating circuit |
| 85 | interconnecting cable |
| 90 | female electrical cigarette lighter connection |
| 95 | male charging adapter plug |
| 100 | charging plug |
| 105 | charging port |
| 110 | full-wave bridge rectifier |
| 115 | voltage regulator |

-continued

| | |
|---|---|
| 120 | auxiliary external components |
| 125 | supplemental rectifying and regulation circuit |

DETAILED DESCRIPTION OF THE PREFERRED EMBODIMENT

The best mode for carrying out the invention is presented in terms of its preferred embodiment, herein depicted within FIGS. 1 through 4. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a bicycle-based electrical generating and charging adapter for mobile electronic devices (herein described as the "apparatus") 10, comprising a bicycle frame-mounted electrical generator 20 in mechanical contact therewith a tire portion 25 of a bicycle 15 to generate electricity. The generated electricity is subsequently supplied thereto a voltage regulating circuit 80 and charging circuit located therein a frame-mounted pouch 52 located along a front portion of the bicycle 15 being convenient thereto an operator. An interconnecting cable 35 is routed to connect the frame-mounted generator 20 to the pouch 52. A specialized cable 100 provides a connection thereto a charging jack 105 of a mobile device 70 such as a cellular phone, which may be placed therewithin the pouch 52, thereby being available for normal use while performing a charging cycle. In such a manner, a user may charge batteries internal to said device 70 while riding the bicycle 15. This recharging apparatus 10 can be especially advantageous in areas where electrical power is not readily available.

Referring now to FIG. 1, a side view of the apparatus 10 installed thereupon a bicycle 15, according to the preferred embodiment of the present invention, is depicted. The bicycle 15 is depicted as a conventional two-wheel bicycle 15 for purposes of illustration; however, it should be noted that any type of bicycle including that of a tricycle type, multi-passenger type, or other designs, may utilize the apparatus 10 equally well. An alternating current (AC) generator 20 is positioned against preferably a rear tire portion 25 of said bicycle 15 using a removably attachable mounting bracket 30 (see FIG. 3). Such electrical generating technology is well-known in the art, and is commonly used to power bicycle head lamps or other indicating devices upon a bicycle 15. The output of the generator 20 is electrically conducted by generator output wiring 35 comprising common insulated copper conductors routed therealong a bicycle frame 40 and being affixed thereto. The generator output wiring 35 is encased along the majority of its routing by a protective sheath 45 such as plastic tubing, a flexible metal conduit, or the like, thereby providing protection therefrom normal wear and tear, mud, rain, sharp objects, entanglement, impact, abrasion, and the like. The protective sheath 45 is held in place preferably using a plurality of common tie-wrap fasteners 50; however, other devices may be used such as clips, straps, or the like positioned about the bicycle frame 40.

The generator output wiring 35 and the protective sheath 45 would terminate at a holding pouch 52 being positioned at a location subjacent thereto a handlebar portion 60 of the bicycle 15. The holding pouch 52 comprises an oval or rectangular shape made of a suitable conforming material such as leather, nylon, canvas, or the like, which provides suitable mechanical protection as well as environmental protection thereto included electronic contents from rain and other similar hazards. The holding pouch 52 would be held in place along the bicycle frame 40 using straps (see FIG. 2). Other mounting areas such as the handlebars 60 may also be utilized with equal effectiveness and as such, should not be interpreted as a limiting factor of the present invention. The holding pouch 52 provides a containment means thereto a charging connection cable 65 being affixed thereto the output wiring 35 at a first end and thereto a mobile electronic device 70 at a second end. Once electrically connected, the charging connection cable 65 and the mobile electronic device 70 would be placed entirely inside of the holding pouch 52 for a period of time while the bicycle 15 is utilized in a normal manner, thereby allowing a charging of said mobile electronic device 70. It should be noted that the mobile electronic device 70 is depicted as a wireless or cellular telephone for purposes of illustration although other electronic devices such as portable music players, digital cameras, computers, personal digital assistants and the like, may utilize the apparatus 10 and as such, should not be interpreted as a limiting factor of the present invention 10. The components of the apparatus 10 are provided in an after-market kit format with a suitable amount of generator output wiring 35 and protective sheath 45, along with a suitable amount of tie-wrap fasteners 50 to allow for mounting on any type of bicycle 15. Such an installation would require a minimal amount of tools and physical skill.

Figure 2:
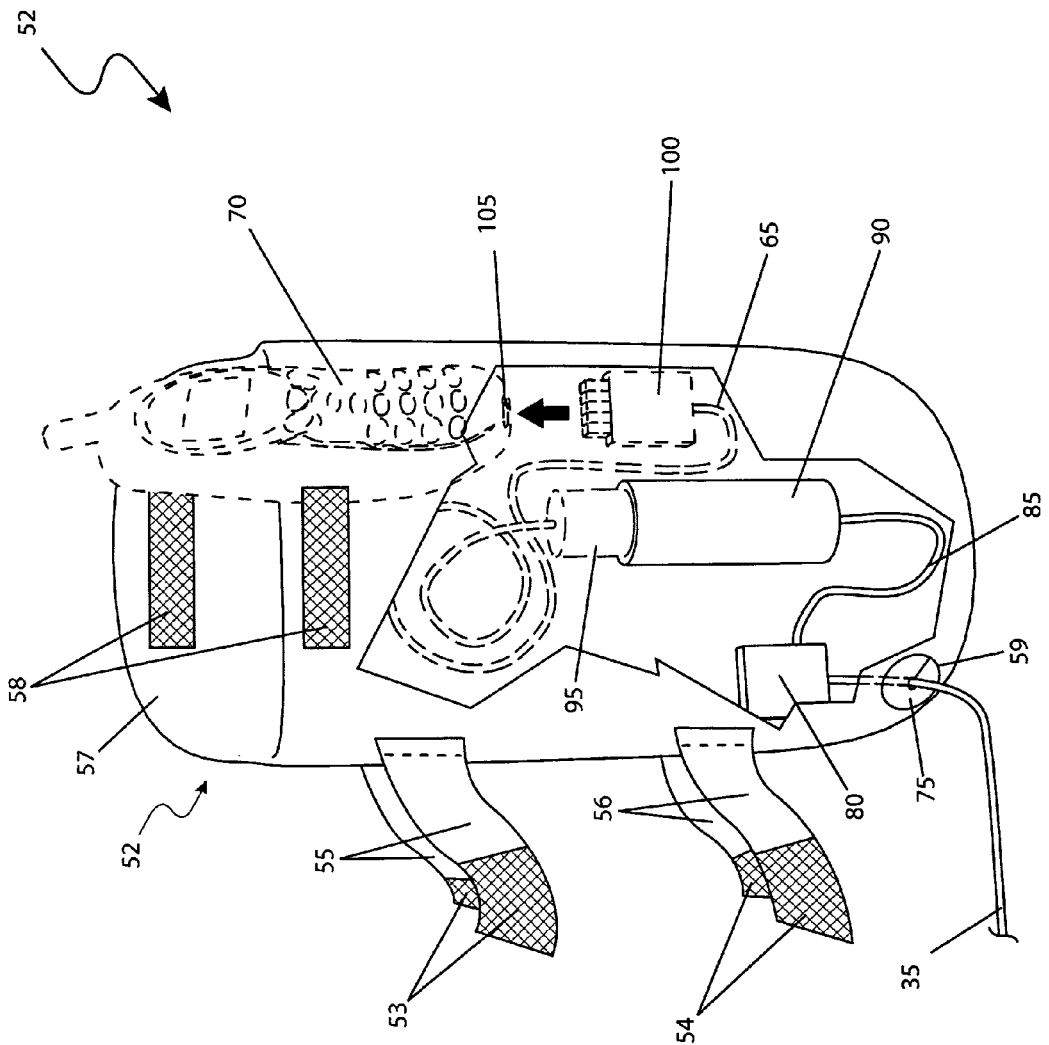
FIG. 2 is a partial cut-away view of the holding pouch portion 52 of the bicycle generating and charging adapter for mobile electronic devices 10, according to the preferred embodiment of the present invention.

Referring next to FIG. 2, a partial cut-away view of the holding pouch portion 52 of the apparatus 10, according to the preferred embodiment of the present invention, is disclosed. This figure more clearly shows the internal components of the holding pouch 52. The generator output wiring 35 is routed thereto a rectifying and regulating circuit 80. The configured output current produced by the rectifying and regulating circuit 80 comprises a 12-volt direct current (DC) configuration and is carried by an interconnecting cable 85 thereto a female cigarette lighter-type connector 90 being similar in construction and function thereto those commonly found in motor vehicles. The generator output wiring 35, the rectifying and regulating circuit 80, and the female cigarette lighter-type connector 90 are routed thereinside the holding pouch 52 via a watertight split rubber grommet 75 located along an exterior surface of the holding pouch 52 and being captivated and secured about a perimeter region therewithin a circular pouch orifice portion 59 of said holding pouch 52.

The grommet 75 comprises a diameter being suitable for sealing and insertion therethrough the rectifying and regulating circuit 80 and the female cigarette lighter-type connector 90 thereinto the holding pouch 52. The holding pouch 52 further comprises a flap 57 located along an upper edge providing a closure means thereto an upper open portion of the holding pouch 52. The flap 57 is secured thereto a front surface of the holding pouch 52, thereby providing a closed state using a flap fastener 58, preferably comprising a pair of sewn-in hook-and-loop fasteners 58. Furthermore, the holding pouch 52 comprises a first pouch strap 55 with a first fastener 53 and a second pouch strap 56 and a second fastener 54, wherein both first 53 and second fastener 54 preferably comprise a pair of corresponding hook-and-loop fastener strips protruding therefrom upper and lower side regions of the holding pouch 52, respectively. Said first 55 and second 56 pouch straps comprise textile members approximately one (1) inch wide having a sufficient length so as to encompass adjacent bicycle frame portions 40. Said first 55 and second 56 pouch straps are affixed thereto said holding pouch 52 using conventional textile assembly techniques such as sewing or adhesives.

The output current conducted thereby the output wiring 35 and subsequently by the female cigarette lighter-type connector 90 would emulate a voltage level as found in common automotive cigarette lighters as well. The female cigarette lighter-type connector 90 provides a standard inserting attachment means thereto a user selected charging connection cable 65 being commonly provided as an accessory thereto many popular mobile electronic devices 70 for portable use or charging thereof in a mobile manner such as in a vehicle. The charging connection cable 65 is envisioned to comprise a male charging adapter plug 95, a supplemental rectifying and regulation circuit 125 (if required), and a charging plug 100. It should be noted that the charging connection cable 65 and portions thereof, are specific thereto the mobile electronic device 70 being utilized and would not be provided with the apparatus 10 as part of an after-market kit. The supplemental rectifying and regulation circuit 125 and the charging plug 100 are envisioned to be specific thereto particular mobile electronic devices 70, thereby providing specific plug configurations of the charging plug 100 being capable of interfacing therewith a charging port portion 105 of the mobile electronic device 70 in a conventional manner. Once all components are interconnected, they would all be inserted and stowed therewithin the holding pouch 52 for an enabling of a charging cycle and for physical protection.

Figure 3:
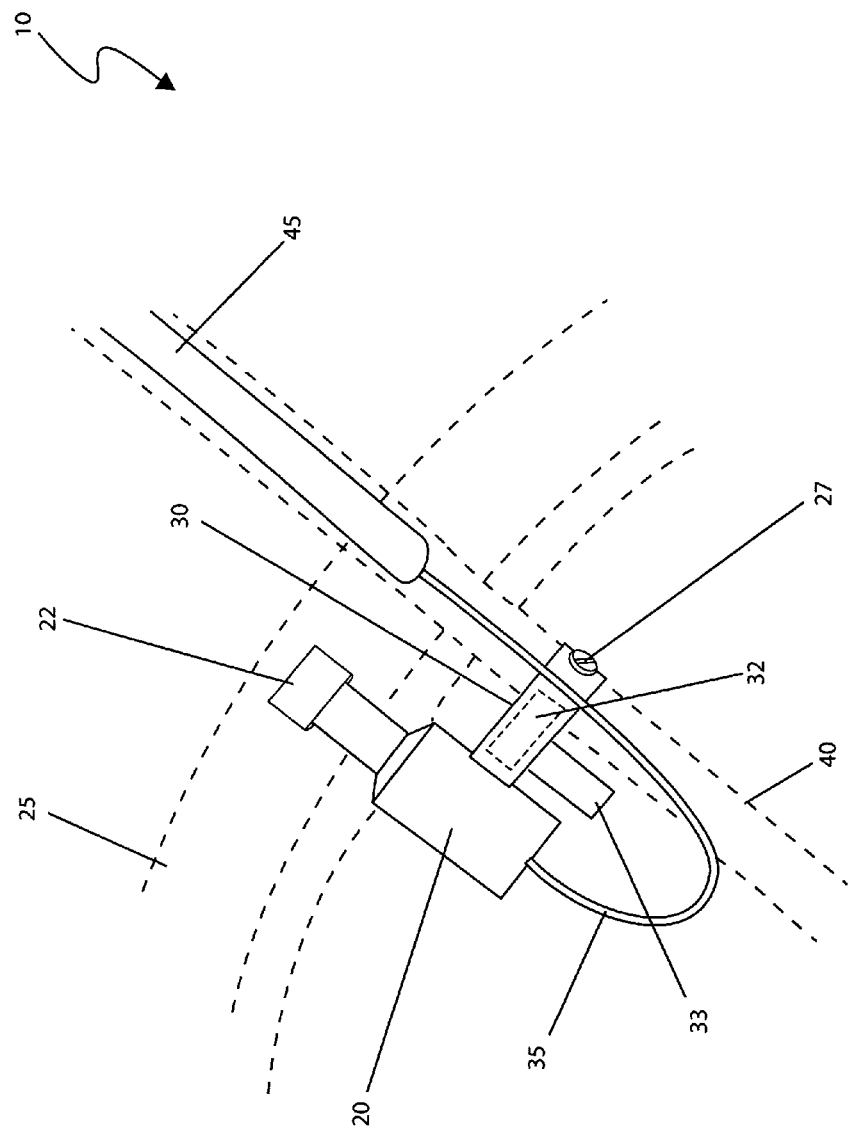
FIG. 3 is a side view of a generator portion 20 of the bicycle generating and charging adapter for mobile electronic devices 10, according to the preferred embodiment of the present invention; and, FIG. 4 is an electronic block diagram of the electronic components as used in the bicycle generating and charging adapter for mobile electronic devices 10, according to the preferred embodiment of the present invention.

Referring now to FIG. 3, a side view of a generator portion 20 of the apparatus 10, according to the preferred embodiment of the present invention, is disclosed.

Such bicycle-based electrical generating technology is conventionally used to power bicycle head lamps or other similar devices providing an attachment means of the generator 20 thereto a bicycle 15 utilizing a metal clamping mounting bracket 30. Said mounting bracket 30 provides removable attachment of the generator 20 thereto various locations along bicycle frame members 40 using a clamping design and being secured thereto said bicycle frame 40 using a common fastener 27 such as a bolt and nut. The mounting bracket 30 is integral thereto the generator 20 protruding therefrom a side surface and providing a mechanical engaging and disengaging means thereagainst a tire portion 25 of the bicycle 15. Said engaging and disengaging means is accomplished via an internal torsion spring 32 which provides a constant pressure between a knurled rotor friction wheel portion 22 of the generator 20 and a bicycle tire 25. Additionally the mounting bracket 30 comprises a digit-operated release lever 33 in a conventional manner, to secure the rotor friction wheel 22 at a distance therefrom said tire 25. In the engaged position, the generator 20 is held against the tire 25 by the torsion spring 32, while in the disengaged position, the generator 20 is positioned away from the tire 25 and is separated by a physical gap. The disengaged position would be utilized when the services of the apparatus 10 are not required, and as such, would not produce additional mechanical drag upon the tire 25 and would also reduce wear and tear upon the generator 20 and tire 25, thus allowing for a longer operating life. The mounting bracket 30, although illustrated herein as applied thereto a rear bicycle frame portion 40, may be also mounted thereto other bicycle frame portions 40, for example, thereto a bicycle frame portion 40 at a forward location so as to utilize contact therebetween the rotor friction wheel 22 and a front tire portion 25 with equal benefit.

Figure 4:
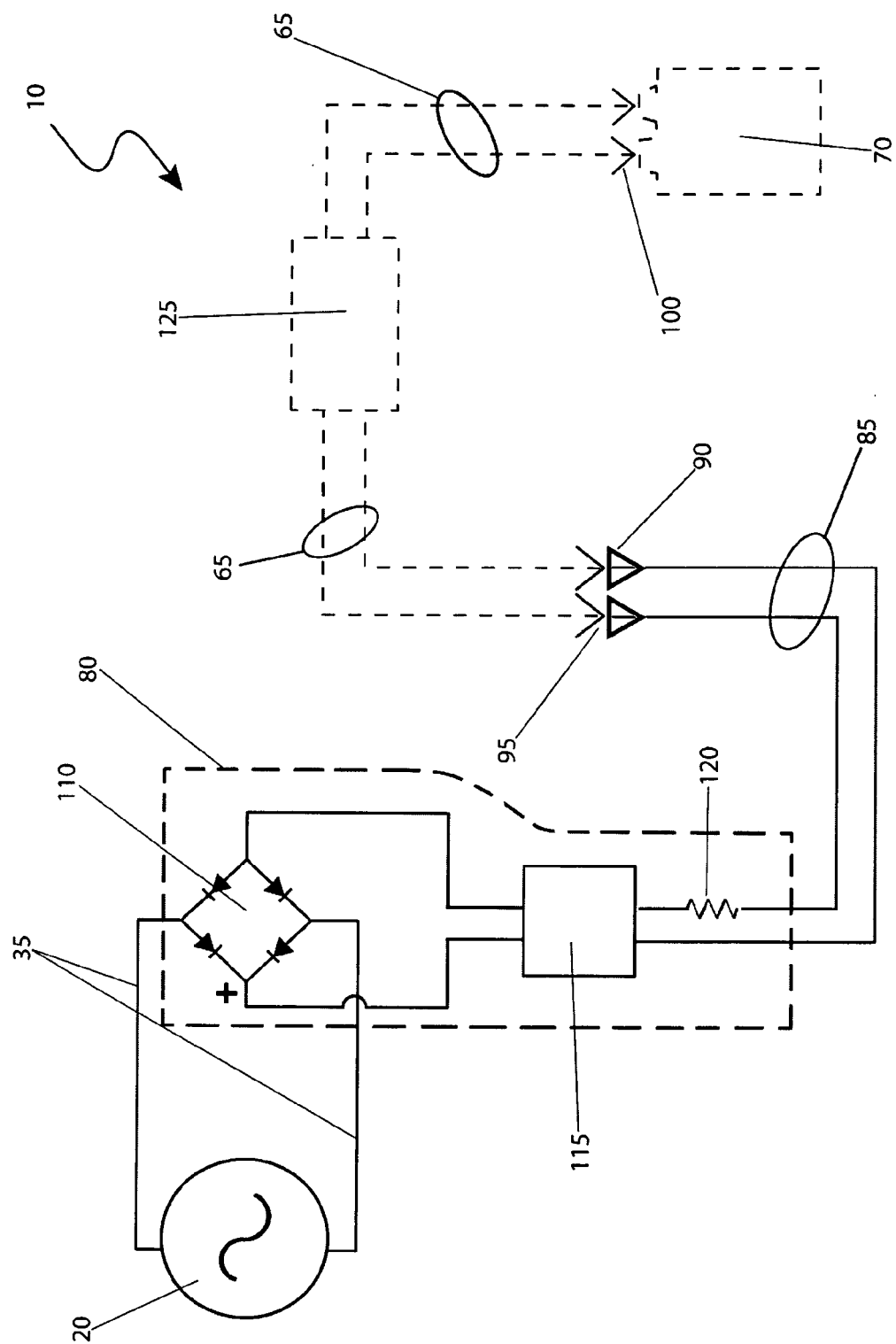

Referring now to FIG. 4, an electronic block diagram depicting the major electronic components as used with the apparatus 10 is disclosed. The electrical output current of the AC generator 20 is conducted by output wiring 35 whereupon serving as an input current thereto the rectifying and regulating circuit 80. The rectifying and regulating circuit 80 is provided with a full-wave bridge rectifier 110 which converts the alternating (AC) output current of the generator 20 thereinto direct current (DC) power. The output current of the full-wave bridge rectifier 110 is then conducted thereto a 12-volt regulator 115 such as a type 7812, +12 voltage regulator with a TO-220 style case. The voltage regulator 115 would be provided with auxiliary external components 120 such as a resistor, or the like, as required. The final output current therefrom the voltage regulator 115 is then communicated thereto the female electrical cigarette lighter connection 90 as shown. The user would then select a proper charging connection cable 65 comprising the male charging adapter plug 95, the supplemental rectifying and regulation circuit 125 (if required), and the charging plug 100. The supplemental rectifying and regulation circuit 125 and the charging plug 100 are envisioned to be specific thereto particular mobile electronic devices 70, thereby providing specific plug configurations of the charging plug 100 along with specific voltage requirements.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by a common user in a simple and effortless manner with little or no training. It is envisioned that the apparatus 10 would be manufactured and installed in general accordance with the teachings of FIGS. 1 through 3.

The method of installing and utilizing the apparatus 10 may be achieved by performing the following steps: mounting of the AC generator 20 thereto a bicycle frame portion 40 adjacent to a tire 25 using the removably attachable mounting bracket 30 and provided fasteners 27; routing the wiring 35 and protective sheath 45 therealong said bicycle frame 40; securing said wiring 35 and sheath 45 thereto the bicycle frame 40 using a plurality of tie-wrap fasteners 50; selecting a suitable location for the holding pouch 52 along a forward portion of the bicycle frame 40 being convenient thereto an operator; securing said holding pouch 52 thereto the bicycle frame 40 using a first 55 and second 56 pouch straps and securing with the first fastener 53 and the second fastener 54; inserting the generator output wiring 35, the rectifying and regulating circuit 80, and the female electrical cigarette lighter connection 90 thereinto the holding pouch 52 via insertion therethrough the pouch orifice 59; securing said rectifying and regulating circuit 80 and female electrical cigarette lighter connection 90 therewithin the holding pouch 52 via installation thereof the split grommet 75 therewithin the pouch orifice 59; electrically connecting the apparatus 10 thereto the charging port portion 105 of the mobile electronic device 70 using an appropriate charging connection cable 65 comprising a male charging adapter plug 95 and a charging plug 100 as manufactured and/or specified by the manufacturer of the utilized mobile electronic device 70; inserting all components, including the charging connection cable 65 and the mobile electronic device 70 thereinto the holding pouch 52; securing said components therewithin said holding pouch 52 using the flap 57 and flap fastener 58; beginning a charging cycle by manually engaging the AC generator 20 therewith the tire 25 using the release lever portion 33 of the mounting bracket 30; riding the bicycle 15 to commence the charging cycle of the mobile electronic device 70 in a normal manner; continuing operation of the bicycle 15 for a period of time depending upon the power requirements of the mobile electronic device 70 at least until the mobile electronic device 70 is charged, or partially charged as viewed sufficient by the user; removing the mobile electronic device 70 therefrom the holding pouch 52 using the by detaching the flap portion 57 therefrom said holding pouch 52 therewith the flap fastener 58; disconnecting the mobile electronic device 70 therefrom the apparatus 10 by utilizing the easy detachment means therebetween the female electrical cigarette lighter connection 90 and the male charging adapter plug 95; using the mobile electronic device 70 in an untethered manner in its prescribed manner; beginning additional charging cycles using the present invention 10 as necessary in a repeating manner.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. An electrical generating and charging adapter for a mobile electronic device, comprising:
    an electrical generator mounted thereto a first location thereof a bicycle frame in mechanical contact therewith a tire portion of a bicycle, further comprising:
        a removably attachable mounting bracket for mounting said electrical generator thereto said first location of said bicycle frame;
        a friction wheel portion at a proximal end of said electrical generator;
        a torsion spring providing an engaging and disengaging means for said friction wheel portion against a tire portion; and,
        a generator output in electrical communication with an interconnecting cable at a distal end of said electrical generator;
    a pouch located mounted thereto a second location thereof said bicycle frame, further comprising:
        a waterproof protective case comprising a first interior portion and a second interior portion;
        a circular pouch orifice located along an exterior surface of said pouch adjacent to said first interior portion;
        a watertight split grommet captivating and securing about a perimeter region of said circular pouch orifice for permitting said interconnecting cable to be routed therethrough; and
        a flap located along an upper edge providing a closure means to said second interior portion;

a charging assembly residing therein said pouch; and, said interconnecting cable routed therealong said bicycle frame to electrically connect said electrical generator thereto said charging assembly;

wherein said electrical generator generates and outputs an electrical current therethrough said interconnecting cable and thereto said charging assembly;

wherein said charging assembly provides a charging means thereto said mobile electronic device;

wherein a battery within said mobile electronic device can be recharged as said operator operates said bicycle;

wherein said mounting bracket is integral to said electrical generator protruding from a side surface;

wherein said electrical current generated by said generator is outputted to said generator output;

wherein said first interior portion comprises a retention means for said charging assembly;

wherein said second interior portion comprises a retention means for said mobile electronic device; and, wherein said watertight split grommet comprises a diameter being suitable for sealing said interconnecting cable as it is routed therethrough.

2. The electrical generating and charging adapter of claim 1, wherein said mounting bracket further comprises a release lever to secure said friction wheel at a distance therefrom said tire portion.

3. The electrical generating and charging adapter of claim 1, wherein said interconnecting cable is affixed at a first end thereto said electrical generator and a second end thereto said charging assembly.

4. The electrical generating and charging adapter of claim 3, wherein said interconnecting cable further comprises insulated copper conductors encased therewith a protective sheath.

5. The electrical generating and charging adapter of claim 4, wherein said interconnecting cable is secured thereto said bicycle frame therewith a plurality of tie-wrap fasteners.

6. The electrical generating and charging adapter of claim 1, wherein said pouch is secured thereto said second location therewith a set of straps and fasteners.

7. The electrical generating and charging adapter of claim 1, wherein said charging assembly further comprises:

a rectifying and regulating circuit receiving said electrical current and producing and outputting a configured output electrical current; and, an electrical receptacle in electrical communication therewith said rectifying and regulating circuit;

wherein said rectifying and regulating circuit, said electrical receptacle, and associated wiring reside therein said pouch.

8. The electrical generating and charging adapter of claim 7, wherein said configured output electrical current comprises a 12-volt direct current (DC) configuration.

9. The electrical generating and charging adapter of claim 8, wherein said electrical receptacle comprise a vehicle cigarette lighter adapter.

10. The electrical generating and charging adapter of claim 9, wherein a charging connection cable provides said charging means thereto said mobile electronic device when inserted therein said electrical receptacle.

11. The electrical generating and charging adapter of claim 1, wherein said first location is adjacent thereto a rear tire.

12. The electrical generating and charging adapter of claim 1, wherein said second location is subjacent thereto a handlebar portion.

13. A method of charging a mobile electronic device therewith an electrical generator generating an electrical current through a motion thereof a bicycle comprises the following steps:

providing said electrical generator, further comprising:

a removably attachable mounting bracket for mounting said electrical generator thereto a first location thereof said bicycle frame, said mounting bracket is integral thereto said electrical generator and protruding therefrom a side surface;

a torsion spring providing an engaging and disengaging means therefor said friction wheel portion thereagainst a tire portion thereof said bicycle;

a friction wheel portion at a proximal end thereof said electrical generator;

a release lever to secure said friction wheel at a distance therefrom said tire portion; and, a generator output in electrical communication therewith said interconnecting cable at a distal end thereof said electrical generator for outputting said electrical current;

providing a charging assembly residing therein an interior of a pouch comprising a pouch orifice protected with a split grommet, a set of mounting straps, and a detachable flap providing access thereto said interior, further comprising:

a rectifying and regulating circuit receiving said electrical current and producing and outputting a configured output electrical current; and, an electrical receptacle in electrical communication therewith said rectifying and regulating circuit;

mounting said electrical generator thereto said first location thereof bicycle frame portion adjacent to said tire portion using said mounting bracket and fasteners;

routing interconnecting wiring affixed at a first end thereto said generator output and at a second end thereto said rectifying and regulating circuit comprising a protective sheath therealong said bicycle frame;

securing said interconnecting wiring thereto said bicycle frame using a plurality of tie-wrap fasteners;

selecting said second location thereof said bicycle frame for mounting said pouch convenient thereto an operator;

securing said pouch thereto said second location using said set of mounting straps and securing with a fastener located thereon each of said set of mounting straps;

inserting said second end thereof said interconnecting wiring, said rectifying and regulating circuit, and said electrical receptacle thereinto said pouch via insertion therethrough said pouch orifice;

securing said rectifying and regulating circuit, and said electrical receptacle therewithin said pouch via installation thereof said split grommet therewithin said pouch orifice;

electrically connecting a charging connection cable of said mobile electronic device therein said electrical receptacle;

inserting said charging connection cable and said mobile electronic device thereinto said pouch;

securing said rectifying and regulating circuit, said electrical receptacle, said charging connection cable, and said mobile electronic device therewithin said pouch by fastening said flap;

beginning a charging cycle by manually engaging said electrical generator therewith said tire portion thereby using said release lever of said mounting bracket;

operating said bicycle to commence said charging cycle of said mobile electronic device in a normal manner, wherein rotation of said tire portion contacts said friction wheel which generates said electrical current, said electrical current travels through said generator output, said interconnecting wire, thereto said rectifying and regulating circuit;

producing a configured electrical current therein said rectifying and regulating circuit, wherein said configured electrical current is routed thereto said electrical receptacle and to said mobile electronic device;

continuing operation of said bicycle for a period of time depending upon a power requirement of said mobile electronic device until a desired electrical charge is transferred thereto a battery of said mobile electronic device;

disconnecting said charging connection cable thereof said mobile electronic device therefrom said electrical receptacle; and, using said mobile electronic device.

14. The method of claim 13, wherein said first location is adjacent thereto a rear tire.

15. The method of claim 13, wherein said second location is subjacent thereto a handlebar portion.

* * * * *